United States Patent
Tano et al.

(10) Patent No.: US 6,777,099 B2
(45) Date of Patent: Aug. 17, 2004

(54) STABILIZED FILM BASED ON TITANIUM-CATALYZED POLYESTERS

(75) Inventors: Kazuo Tano, Wiesbaden (DE); Ursula Murschall, Nierstein (DE); Holger Kliesch, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/242,043

(22) Filed: Sep. 12, 2002

(65) Prior Publication Data

US 2003/0236385 A1 Dec. 25, 2003

(30) Foreign Application Priority Data

Jun. 20, 2002 (DE) .......................................... 102 27 437

(51) Int. Cl.$^7$ .............................. B32B 27/36; D01D 5/12
(52) U.S. Cl. ...................... 428/480; 528/272; 528/287; 528/293; 528/298; 528/302; 528/307; 528/308; 528/308.6; 524/81; 524/115; 524/186; 524/323; 264/176.1; 264/210.7; 264/211.12; 264/212; 264/141; 430/32
(58) Field of Search ................................ 528/272, 287, 528/293, 298, 302, 307, 308, 308.6; 524/81, 115, 186, 323; 264/176.1, 210, 211.12, 212, 141; 428/480; 430/32

(56) References Cited

U.S. PATENT DOCUMENTS

| 4,058,502 A | | 11/1977 | Dexter et al. .......... 260/45.85 B |
| 5,556,739 A | * | 9/1996 | Nakanishi et al. .......... 430/533 |
| 5,562,984 A | * | 10/1996 | Mortlock et al. ........... 428/364 |
| 6,485,810 B1 | * | 11/2002 | Uchida et al. .............. 428/141 |
| 2002/0065346 A1 | * | 5/2002 | Murschall et al. .......... 524/323 |

FOREIGN PATENT DOCUMENTS

| AT | 404 134 B | 8/1998 |
| KR | 2001-47779 | 2/2002 |
| WO | WO 03 046068 | 6/2003 |

* cited by examiner

*Primary Examiner*—Samuel A. Acquah
(74) *Attorney, Agent, or Firm*—ProPat, L.L.C.

(57) ABSTRACT

Polyester films which comprise a stabilizer for inhibiting oxidative degradation, at least some of which has been covalently incorporated into the polymer chain of the polyester through polycondensation during formation of the polyester, have not only high resistance to oxidation but also very few surface defects and high stability during processing, and are suitable not only for use as a packaging material but for a wide variety of other technical applications.

21 Claims, No Drawings

STABILIZED FILM BASED ON TITANIUM-CATALYZED POLYESTERS

The invention relates to a single- or multilayer, biaxially oriented film based on preferably titanium-catalyzed polyesters and comprising at least one primary stabilizer for inhibiting oxidative degradation. The invention further relates to the use of a film, and to a process for its production.

BACKGROUND OF THE INVENTION

The catalysts used industrially for the polycondensation of polyesters are antimony compounds, titanium compounds, and germanium compounds. Of this group, germanium-containing catalysts have the highest catalytic activity, followed by titanium catalysts. Antimony catalysts have the lowest relative activity. However, the vast majority of the polyesters used in the world market are prepared with the aid of antimony catalysts. The reason for this is that germanium catalysts are generally uneconomic due to their extremely high price, and titanium catalysts can cause undesirable yellowing and reduced heat resistance in the resultant film. This is the result of side reactions which lead to an increased number of undesirable gel particles and also to a marked reduction in the stability of films of this type during processing.

Nevertheless, there is a high level of interest in markedly reducing the concentration of antimony in polyester products, one reason being that there are new EU directives which prescribe limits for antimony migration, and compliance with these is particularly difficult in low-crystallinity PET (polyethylene terephthalate).

Films based on polyesters, in particular based on polyethylene terephthalates, are known. Polyester films which comprise additives for inhibiting oxidative degradation have also been described.

Polyester films are generally produced from polymer pellets melted in an extruder. The resultant polymer melt is molded by way of a slot die to give what is known as a prefilm. The prefilm is then applied to a take-off roll and chill roll, and then stretched longitudinally and transversely, and finally wound up. These films are intended to have a low number of gel particles and other defects which impair appearance or further processing. Gel particles in the film reduce stability during processing in film production, i.e. they cause undesirable break-off. In addition, gel particles block the extrusion screens, causing further economic losses.

It is therefore an object to find a polyester film which does not have the disadvantages known from the prior art, e.g. high antimony content and gel particles in the film. In particular, the film should have fewer specks and fewer defects caused by gel particles. In addition, stability during processing should be increased, i.e. no film break-offs or similar disruptions should occur during production. The screen service times should be prolonged, and it should also be possible for even relatively large proportions of the film regrind to be reusable. Furthermore, these improved properties should permit optimization of throughput and production speed.

BRIEF DESCRIPTION OF THE INVENTION

The object is achieved by way of a film based preferably on a polyester which uses titanium-based catalysis and comprises a stabilizer at least some of which has been covalently incorporated into the polyester. This covalent incorporation of the stabilizer is preferably achieved by adding the stabilizer to the polyester polymers before polycondensation begins.

The present invention therefore provides a single- or multilayer, biaxially oriented film, preferably based on a Ti-catalyzed (Ti=titanium) polyester, and comprising at least one (primary) stabilizer for inhibiting oxidative degradation, wherein at least some of the (primary) stabilizer present in the polyester is in covalently bonded form.

DETAILED DESCRIPTION OF THE INVENTION

The proportion of the stabilizer in the polyester of the invention is preferably from 100 to 10 000 ppm, in particular from 150 to 3 000 ppm, particularly preferably from 200 to 1 000 ppm. ppm are parts by weight based on the total weight of the polyester comprising the stabilizer. It is also possible to use mixtures of various stabilizers.

This "primary" stabilizer is preferably a constituent of the main polymer chain of the polyester. It therefore contains groups capable of polycondensation during formation of the polyester, preferably carboxy and/or ester groups, particularly preferably ester groups. Particularly preferred primary stabilizers are phenolic compounds, in particular sterically hindered phenols, which have additional ester groups and/or carboxy groups which are capable of participating in the polycondensation reaction. Examples of these sterically hindered phenols are obtainable with the name Irganox® from Ciba Specialty Chemicals. Other suitable stabilizers are thiobisphenols, alkylidenebisphenols, alkylphenols, hydroxybenzyl compounds, acylaminophenols, and hydroxyphenylpropionates. Aromatic compounds having 2 or more secondary amino groups are also suitable. Theme primary stabilizers are described by way of example in the monograph by Gächtar and Müller *"Kunststoffadditive"* [Plastics additives], 2nd edition, Carl Hanser Verlag, and in the monogragh by Dr. Hans Zweifel, *"Plastics Additives Handbook"*, 5th edition, Carl Hanser Verlag.

Where appropriate, these primary stabilizers are used in combination with secondary stabilizers which support, or else intensify, the action of the primary stabilizers. Particularly suitable secondary stabilizers are thioethers, and also zinc dibutyldithiocarbamates. The secondary stabilizer is usually an additive, i.e. is not an integral (covalently bonded) constituent of the polyester. Its proportion is preferably 0.01 to 1.0% by weight, in particular from 0.05 to 0.5% by weight, based in each case on the weight of the polyester comprising the stabilizer.

The polyester of the invention having the covalently incorporated primary stabilizer (also termed "modified polyester" below) preferably has an SV in the range from 450 to 1 100, in particular from 700 to 900.

If this polyester is prepared by the dimethyl terephthalate (DMT) process, for example, it is advantageous for the primary stabilizer to be added prior to the transesterification process, or after the transesterification process and directly prior to the polycondensation process, in the form of a solution or dispersion in glycol. The melt resistivity of the resultant modified polyester is in the range from $1 \cdot 10^7$ to $120 \cdot 10^7$ ohm/cm, and is therefore not significantly different from that of an unmodified polyester. Where appropriate, the melt resistivity may be adjusted by adding ionic additives until the desired value has been reached. Examples of these additives are magnesium stearate and potassium acetate, etc.

The modified polyester preferably contains units of ethylene glycol and terephthalic acid and/or units of isophthalic acid, naphthalene-2,6-dicarboxylic acid, and/or biphenyldicarboxylic acid (=bibenzoic acid), and/or units of aliphatic or cycloaliphatic diols having from 2 to 8 carbon atoms, in particular of propylene glycol, butylene glycol, and/or cyclohexanedimethanol. The materials are therefore preferably modified polyethylene terephthalates, polybutylene terephthalates, poly(1,4-cyclohexanedimethylene terephthalate), polyethylene naphthalene-2,6-dicarboxylate, polyethylene naphthalene-1,5-dicarboxylate, or polyethylene naphthalate/bibenzoate. Among these, preference is given to modified polyethylene terephthalate (PET) and modified polyethylene naphthalate (PEN), and also to mixtures of these. In another preferred embodiment, the polyester also contains up to 5% by weight isophthalic acid.

The term modified polyethylene terephthalates or polyethylene naphthalates here is intended to mean homopolymers, compounded materials, copolymers, recycled materials, and other variants.

An example of a method for preparing the polyesters of the invention is from dimethyl terephthalate, using known processes, e.g. using the transesterification process (DMT process). Suitable transesterification catalysts used here are salts of zinc, of magnesium, of calcium, of manganese, of lithium, or of germanium. The polyesters of the invention may also be prepared by direct esterification (PTA process). Use may be made here of various polycondensation catalysts.

For the purposes of the invention, preference is given here to titanium compounds at a concentration in the polyester of from 1 to 300 ppm (based on titanium), preferably from 2 to 100 ppm, and particularly preferably from 5 to 50 ppm. Besides these, germanium catalysts and/or antimony catalysts may also be present, the concentration for antimony being from 0 to 150 ppm, preferably from 0 to 50 ppm, and particularly preferably <2 ppm. The germanium concentration is preferably from 0 to 10 ppm, in particular <1 ppm.

The polyesters used for the films of the invention are preferably prepared by direct esterification, using titanium catalysts.

The stabilizers are added to the starting components prior to the polycondensation process and at least some of these are incorporated into the main polymer chain of the polyester by polycondensation.

The primary stabilizer incorporated via bonding reduces thermal degradation of the polymer during the polycondensation reaction. This applies both to the DMT process and to the PTA process, and is particularly important during the preparation of polyesters filled with pigments or with particles (in particular silicon dioxide). These pigments or particles are similarly added prior to the polycondensation process.

Up to 50 mol %, preferably up to 30 mol %, of the polymer units in the polyester may have been replaced by units of comonomers. There may be some degree of replacement here of the dicarboxylic acid component, the glycol component, or both. Examples of another acid component which may be present in the polyesters are adipic acid, glutaric acid, succinic acid, sebacic acid, the sodium salt of 5-sulfoisophthalic acid, and also polyfunctional acids, such as trimellitic acid.

The biaxially oriented film of the invention generally has a thickness of from 0.5 to 500 $\mu$m, preferably from 1 to 250 $\mu$m, particularly preferably from 2 to 30 $\mu$m.

Surprisingly, the use of the modified polyesters of the present invention during film production practically eliminates the occurrence of die deposits. Profile and roll formation are therefore markedly better for the resultant film than for films made from standard polymers (i.e. polyesters without stabilizers incorporated via condensation). Even after two days of production, no deposits of any kind are found. This means that the profile of the film can be held precisely constant over a very long period, leading to very good roll formation. Surprisingly, the number of gel bodies and specks is markedly lower when comparison is made with a film made from unmodified polyester, even when use is made of Ti-catalyzed polyester, and there is therefore an enormous improvement in surface quality. Even at relatively high production speeds, film break-offs are practically eliminated. During two days of production of a very thin film with a thickness of 4.5 $\mu$m, produced at a high production speed (more than 280 m/min), not one single break-off occurred.

It is also surprising that when the polyesters of the invention are used the service life of the polymer screens is longer. The service lives are markedly prolonged, sometimes doubled, depending on the type of film. The cost-effectiveness of film production has therefore been markedly improved. It is also surprising that even large amounts (up to 60% by weight) of the regrind arising directly during film production can be reused without any adverse effect on the properties of the film. Despite the use of titanium catalysts, and despite the use of large amounts of regrind, there was no impairment of the Yellowness Index of the film, and this more than surprising.

The polyester film of the invention may also have a multilayer structure. It is then generally comprised of at least one core layer or base layer and of at least one outer layer. Preference is given to three-layer films with A-B-A or A-B-C structure (B=core layer, A and C=outer layers). The core layer here is preferably composed of the stabilizer-modified polyester, in particular of a polyethylene terephthalate homopolymer. The term modified PET homopolymers is used here for polymers in which no units of other monomers are present alongside the ethylene glycol units, the terephthalic acid units, and the units of the stabilizer. The outer layers may be composed of modified or unmodified PET homopolymers, modified or unmodified PEN homopolymers, modified or unmodified poly(ethylene terephthalate-ethylene naphthalate) copolymers, or of corresponding compounded materials, for example.

Besides the primary stabilizers and, where appropriate, secondary stabilizers, other conventional additives may also be present in the core layer or base layer and/or outer layer(s), examples being antiblocking agents, soluble dyes, white pigments and/or color pigments. It is advantageous for the additives to be added to the polymer or polymer mixture before melting begins.

Other additives which may be used are mixtures of two or more different antiblocking agents, and mixtures of antiblocking agents of the same makeup, but of different particle size. The particles may be added to each of the layers in the usual concentrations, for example in the form of a glycolic suspension, before the polycondensation process is complete, or subsequently directly prior to the extrusion process, in the form of one or more masterbatches. Additive concentrations in the range from 0.0001 to 20.0% by weight, based on the weight of the layer(s) provided therewith, have proven to be particularly suitable.

The structure of the multilayer films may therefore be either symmetrical or asymmetrical. Base and/or outer layers may have been provided with further additives, or be composed of a very wide variety of polyesters (e.g. with varying molecular weight or with varying viscosity). A particularly simple method of producing the multilayer films is coextrusion.

One way of producing a film is to use what is known as a fully prepared polymer, to which all of the additives have been added prior to the polycondensation process. In another method, some or all of the additives, other than the primary stabilizer, may also be added during film production, i.e. after the polycondensation process, preferably with the aid of masterbatch technology. To this end, various raw material components, each of which comprises various additives, are mixed prior to the extrusion process. The modified polyester here may form what is known as the clear polymer, or at least form a substantial constituent of the clear polymer, to which the masterbatches with the various additives are then added. The modified polyester may also be introduced solely or additionally by way of the masterbatches.

The raw material components, and also any masterbatches used, should preferably be precrystallized or predried. The predrying advantageously comprises gradual heating at subatmospheric pressure (e.g. from 20 to 80 mbar, preferably from 30 to 60 mbar, in particular from 40 to 50 mbar), and also stirring and, where appropriate, after-drying at a constant, elevated temperature (likewise at subatmospheric pressure). It is advantageous for the raw material components to be charged together with the polymers of the base and/or outer layers and, where appropriate, with other components at room temperature, preferably batchwise, to a vacuum dryer. In the course of the drying time or residence time the material transverses a temperature profile from about 10 to 160° C., preferably from 20 to 150° C., in particular from 30 to 130° C. During the residence time of about 6 hours, preferably 5 hours, in particular 4 hours, the mixture of raw materials is stirred at from 10 to 70 rpm, preferably from 15 to 65 rpm, in particular from 20 to 60 rpm. The resultant precrystallized or predried mixture of raw materials is after-dried in a downstream container, likewise (partially) evacuated at from 90 to 180° C., preferably from 100 to 170° C., in particular from 110 to 160° C., for from 2 to 8 hours, preferably from 3 to 7 hours, in particular from 4 to 6 hours.

In the extrusion process preferred according to the invention for producing the film, the molten polyester material or molten mixture of raw materials is extruded or, respectively, coextruded through a flat-film die, and quenched on a chill roll, in the form of a substantially amorphous prefilm. This film is then reheated and stretched (oriented) longitudinally and transversely, or transversely and longitudinally, or longitudinally, transversely, and again longitudinally and/or transversely. The stretching temperatures are generally above the glass transition temperature $T_g$ of the film by from about 10 to 60° C., and the longitudinal stretching ratio is usually from 2 to 6, in particular from 3 to 4.5, and the transverse stretching ratio is usually from 2 to 5, in particular from 3 to 4.5, and the ratio for any second longitudinal and transverse stretching carried out is from 1.1 to 3. The first longitudinal stretching may also be carried out simultaneously with the transverse stretching (simultaneous stretching). Heat-setting of the film then follows at oven temperatures of from about 150 to 250° C., in particular from 170 to 240° C. The film is then cooled and wound up.

The films of the invention have a combination of excellent properties making them suitable for a wide variety of applications, particularly in industry, in electronics, for thermal transfer, as a packaging material, as a magnetic tape film, stamping foil, release film, or lid film, or as a capacitor film, or as an insulating material, or for lamination, to mention just a few examples. The films are used with particular advantage wherever quality has to be particularly high and consistent.

In the examples below, the following standards or methods are used for measuring each of the properties. These test methods are also applicable to the parameters used in the description above.

Average Thickness

Average thickness $d_F$ is determined from the weight of a film, given known length, width, and density. The weight measured is that of a film strip prepared on the trimming table, taken from the center of a specimen which traverses the entire width of the roll. The calculation of $d_F$ uses the formula $$d_F[\mu m] = \frac{m[g]}{l[mm] \cdot b[mm] \cdot d[g/cm^3]} \cdot 10^{-6}$$

where: m=weight of tested film section
  l=specimen length
  b=specimen width
  d=density of material tested (e.g. 1.395 g/cm$^3$ for polyester)

After cutting to size, each of the film strips is weighed on a Mettler PM 200 analytical balance (maximum weight 200 g), attached to which there is an HP Vectra ES/12 computer which, after machine and roll number have been input, takes all of the parameters from the OPUS program and thus calculates average thickness.

Yellowness Index:

Yellowness Index (YI) is the deviation from the colorless condition in the "yellow" direction, and is measured to DIN 6167. Yellowness Index values below 5 are not visible.

(DIN=Deutsches Institut für Normung [German Institute for Standardization])

Standard Viscosity (SV) and Intrinsic Viscosity (IV):

Standard viscosity SV was determined by a method based on DIN 53726, using a 1% strength solution in dichloroacetic acid (DCA) at 25° C. SV (DCA)=($h_{rel}$−1)×1 000. Intrinsic viscosity (IV) is calculated from standard viscosity (SV) as follows $$IV=[\eta]=6.907 \cdot 10^{-4 \cdot SV\ (DCA)} + 0.063096\ [dl/g]$$

Surface Defects

Surface defects (gel bodies and specks) are determined visually.

Roll Formation

Roll formation is assessed visually under the criteria "longitudinal corrugations, creases, and run-out".

Break-offs

The number of break-offs per unit of time during production is compared with that when using conventional polymer, and the percentage variance is found.

Die Deposits

Die deposits are determined visually.

Film Profile

Film profile is determined by a capacitative method with the aid of an ML 210-12-1 electronic thickness measurement device from Eichhorn-Hausmann (Germany). For this, a strip of width 70 mm is cut out transversely across the entire width of the film and wound up on an aluminum roller. The film is unwound from the roll using roll-unwinding equipment, and during this process is passed between 2 capacitor plates. The dielectric constant set is 3.30.

The electrical potential differences brought about by the differences in thickness of the film are converted into a thickness profile with the aid of suitable software.

The value ΔE gives the difference between the maximum and minimum thickness across the entire width of the film.

Extrusion Screen Service Life (Polymer) screen changes can be required firstly as a result of reaching the pressure limit and secondly through formation of specks or gel bodies. After a certain number of days, screen service life is compared with that when using a conventional polymer, and the percentage variance is found.

The examples below give further illustration of the invention but do not in any way restrict the same. Percentages here are percentages by weight unless otherwise stated or unless clear from the context; ppm=parts by weight.

EXAMPLE 1

Polyethylene terephthalate (PET) (KoSa, Germany) which comprises 1 000 ppm of Irganox® 1010 (Ciba Specialties, Switzerland) as an integral constituent of the polymer chain (polymer 1), and also comprises 25 ppm of titanium from the potassium titanyl oxalate polycondensation catalyst, having an SV of 810, was dried at 160° C. to residual moisture 50 ppm, and fed to an extruder. The film also comprised 30% of self-regrind. Stepwise longitudinal and transverse orientation was used to produce a single-layer glass-clear film of thickness 50 μm. The film was produced for 7 days at a speed of 110 m/min.

EXAMPLE 2

A film of the following makeup was produced at a thickness of 4.5 μm:

60% of polymer 1 from example 1;
10% of PET masterbatch which comprised 1 200 ppm of Irganox® 1010 condensed into the polymer chain, 20 000 ppm of Sylobloc® 44H (Grace, Germany, $SiO_2$ antiblocking agent) as additive, and 15 ppm of titanium from tetraisopropyl titanate used as polycondensation catalyst;
30% of the regrind directly arising during the production process.

The production speed was 280 m/min, and the production time was 14 days.

EXAMPLE 3

A film of thickness 12 μm was produced from a polymer which comprised, besides polyethylene terephthalate, 500 ppm of Irganox® 1010 condensed into the polymer chain, 1 500 ppm of Sylobloc 44H as additive, and 30 ppm of titanium from lithium titanyl oxalate used as polycondensation catalyst. The proportion of self-regrind was 40%. The production speed was 340 m/min, and the production time was 12 days.

COMPARATIVE EXAMPLE c1

Example 2 was repeated, except that no Irganox® 1010 was present in the polymers used.

COMPARATIVE EXAMPLE c2

Example 3 was repeated, except that no Irganox® 1010 was present in the polymers used.

The table below shows the property profile of the films produced as in the examples and comparative examples:

|  |  | Examples | | | | |
|---|---|---|---|---|---|---|
| Properties |  | 1 | 2 | 3 | c1 | c2 |
| Average thickness | μm | 50 | 4.5 | 12 | 4.5 | 12 |
| Profile ΔE | μm | 0.4 | 0.3 | 0.4 | 0.7 | 0.6 |
| Surface defects)[1] |  | 7 | 9 | 9 | 30 | 25 |
| Roll formation |  | good | good | good | longitudinal corrugations, creases | longitudinal corrugations, creases |
| Break-offs)[2] | % | 25 | 70 | 50 | 0 | 0 |
| Screen service life)[2] | % | 35 | 90 | 70 | 0 | 0 |
| Yellowness Index |  | 4 | 1.8 | 2.5 | 2.4 | 5 |
| Die deposits |  | none found | none found | none found | clearly visible | clearly visible |

)[1]= number of defects per 5 $m^2$
)[2]= improvement in % over "standard"

What is claimed is:

1. A polyester film comprising titanium derived from a titanium catalyst and at least one stabilizer for inhibiting oxidative degradation, wherein at least some of the stabilizer has bean covalently incorporated into the polymer chain of the polyester.

2. The polyester film as claimed in claim 1, wherein the stabilizer has at least two groups capable of polycondensation during polyester formation.

3. The polyester film as claimed in claim 2, wherein, the groups are selected from one or more of carboxy groups and ester groups.

4. The polyester film as claimed in claim 1, wherein the stabilizer is a sterically hindered phenol.

5. The polyester film as claimed in claim 1, wherein the proportion by weight of the stabilizer is from about 100 to about 10 000 ppm, based on the total weight of the polyester comprising the stabilizer.

6. The polyester film as claimed in claim 5, wherein the proportion is from about 150 to about 3 000 ppm.

7. The polyester film as claimed in claim 1, which comprises one or more other stabilizers which have not been covalently incorporated into the polymer chain of the polyester.

8. The polyester film as claimed in claim 1, wherein the stabilizers are selected from one or more of thioethers and zinc dibutyldithiocarbamate.

9. The polyester film as claimed in claim 1, wherein the polyester has units selected from one or more of ethylene glycol end terephthalic acid and isophthalic acid, naphthelene-2,6-dicarboxylic acid, biphenyldicarboxylic acid, and aliphatic and cycloaliphatic diols having from 2 to 8 carbon atoms.

10. The polyester film as claimed in claim 1, wherein the polyester comprising the stabilizer has a standard viscosity of from about 450 to about 1100.

11. The polyester film as claimed in claim 1, wherein the polyester comprises polyethylene terephthalate or polyethylene naphthalate or a mixture of these.

12. The polyester film as claimed in claim 1, wherein the polyester has an antimony content of less than about 150 ppm.

13. The polyester film as claimed in claim 1, which has a multilayer structure.

14. The polyester film as claimed in claim 1, which has an A-B-C layer structure, the outer layers A and C being identical or different.

15. The polyester film as claimed in claim 1, which comprises other additives.

16. The polyester film as claimed in claim 15, wherein the additives are selected from one or more of antiblocking agents, dyes, white pigments, and color pigments.

17. A polyester comprising at least one stabilizer for inhibiting oxidative degradation, wherein at least some of the stabilizer has been covalently incorporated into the polymer chain of the polyester.

18. A process for producing a polyester film as claimed in claim 1, comprising the steps of
    a) producing a single- or multilayer film by extrusion or coextrusion and shaping the melts to give flat melt films,
    b) biaxially stretching the film, and
    c) heat-setting the stretched film.
    wherein at least one layer of the film comprises a polyester as claimed in claim 18.

19. A method of making a thermal transfer ribbon, a packaging material, a magnetic tape film, a stamping foil, a release film, a lid film, a capacitor film as an insulating material, which method comprises transforming a polyester film as claimed in claim 1 into a thermal transfer ribbon, a packaging material, a magnetic tape film, a stamping foil, a release film, a lid film, a capacitor film as an insulating material.

20. A polyester film comprising titanium derived from a titanium catalyst and at least one stabilizer for inhibiting oxidative degradation, wherein at least some of the stabilizer has been covalently incorporated into the polymer chain of the polyester, said titanium present in a concentration ranging from 1 to 300 ppm.

21. A polyester film comprising titanium derived from a titanium catalyst and at least one stabilizer for inhibiting oxidative degradation, wherein at least some of the stabilizer has been covalently incorporated into the polymer chain of the polyester, said polyester film exhibiting at least a 25% improvement in Yellowness index in comparison to comparable polyester film formed without stabilizer.

* * * * *